No. 778,216. PATENTED DEC. 27, 1904.
T. H. BRIGG.
NECK YOKE.
APPLICATION FILED APR. 22, 1904.
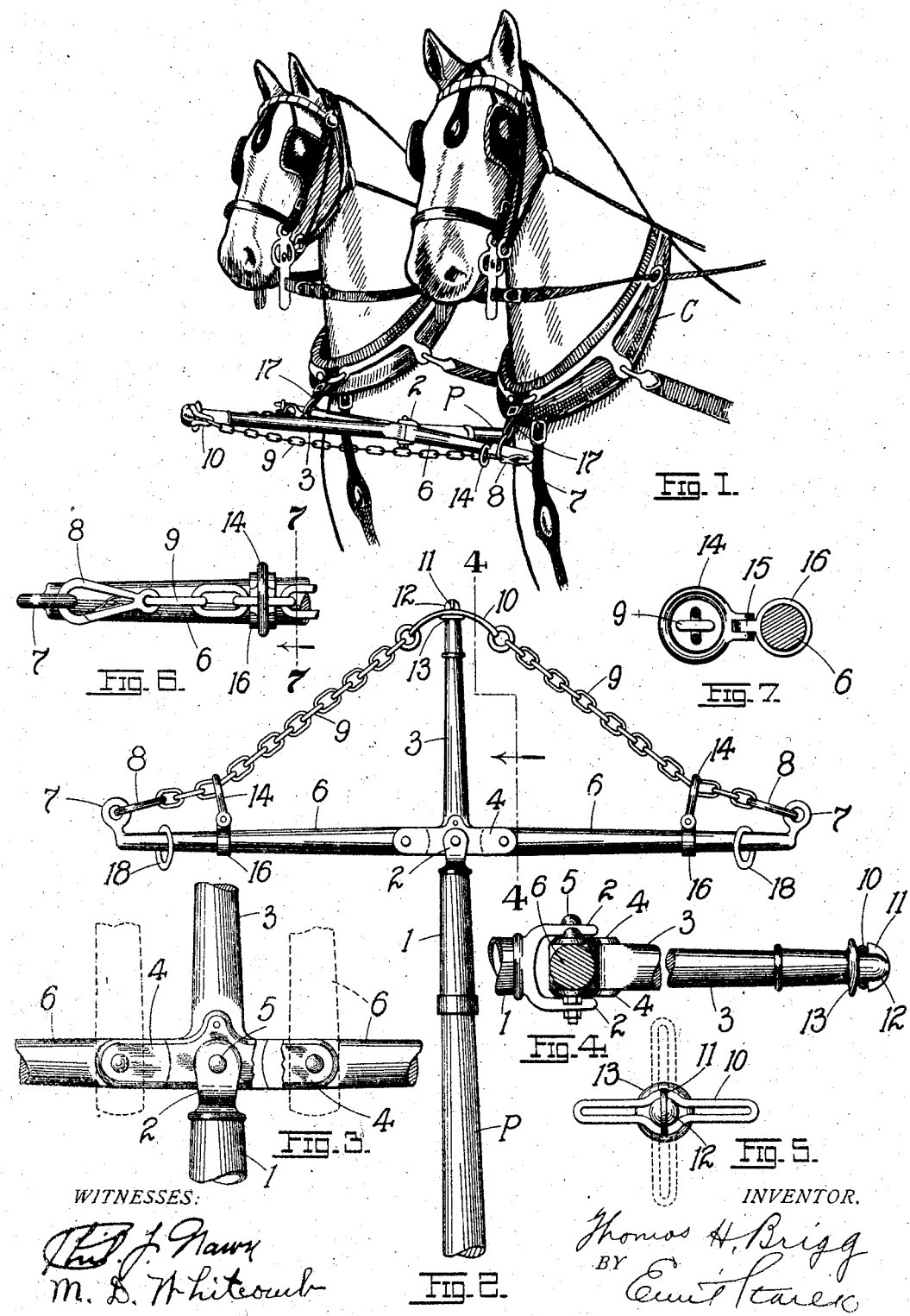
WITNESSES:
INVENTOR.
Thomas H. Brigg
BY
ATTORNEY.

No. 778,216. Patented December 27, 1904.

UNITED STATES PATENT OFFICE.

THOMAS H. BRIGG, OF ST. LOUIS, MISSOURI.

NECK-YOKE.

SPECIFICATION forming part of Letters Patent No. 778,216, dated December 27, 1904.

Application filed April 22, 1904. Serial No. 204,429.

*To all whom it may concern:*

Be it known that I, THOMAS H. BRIGG, a subject of the King of Great Britain, residing at St. Louis, State of Missouri, have invented certain new and useful Improvements in Neck-Yokes, of which the following is a full, clear, and exact description, reference being had to the accompanying drawings, forming a part hereof.

My invention has relation to improvements in neck-yokes; and it consists in the novel construction and arrangement of parts more fully set forth in the specification and pointed out in the claims.

In the drawings, Figure 1 is a perspective showing the application of my invention. Fig. 2 is a plan of the neck-yoke. Fig. 3 is an enlarged plan of the meeting ends of the yoke-arms, pole extension, and socket to which the extension is coupled. Fig. 4 is a longitudinal section on line 4 4 of Fig. 2. Fig. 5 is an end view of the pole extension, showing the link of the pole-pieces in its locked position. Fig. 6 is a front view of the outer end of one of the yoke-arms, and Fig. 7 is a cross-section on line 7 7 of Fig. 6.

The present invention is preferably used in conjunction with poles that are pivotally connected to the vehicle, (in contradistinction to rigid poles,) and has for its object to provide a connection between the pole and the collar of the draft-animal which will eliminate undue strains in any direction whatsoever. It will allow the wheels to pass over rough ground without dipping the pole into abnormal positions which will either injure the horses or bring them into uncontrollable attitudes; it will afford a ready lateral movement to the horses, at the same time giving the device an improved appearance in front of the horses; it will impart a grace unattainable with any other form of yoke; it is adjustable to any size horse; it enables the animals to pull straight and retard and back straight; it saves the horses from undue lateral and vertical strains; it facilitates the yoking of the horses; it transmits the strains through the pole direct, thereby reducing the possibility of breakage to a minimum, and it offers, further, other and sundry advantages better apparent from a detailed description of the invention, which is as follows.

Referring to the drawings, P represents the carriage-pole, which in the present instance is made shorter than usual. The free end of the pole is received loosely in a socket 1, freely rotatable about the axis of the pole, the forward end of the socket terminating in a fork 2, the members of which pivotally embrace the base of the pole extension 3. The latter is provided with the laterally-extending basal plates 4 4, through the centers of which the pivotal bolt 5, by which the parts 1 and 3 are coupled, passes. Between the opposite ends of the plates 4 4 are pivotally mounted the yoke-arms 6 6, said arms being capable of oscillation in a plane parallel to the axis of the pole or of the pole extension 3. Under normal conditions the arms 6 6 are in alinement, as shown in Fig. 2, though the oscillation referred to will permit one arm to swing outwardly in the event one of the horses should for any reason be slightly in advance of the other.

The free ends of the arms 6 are provided with loops 7, to which are secured, by means of snap-hooks 8, the opposite ends of the pole-pieces 9, (chain or leather,) the medial portion of the pole-pieces being provided with an elongated link 10, the centers of whose sides are distended outwardly, so that when said link is swung in a plane parallel to the arms 6 6 said distended sides will pass under the bases of the wings or ribs 11, formed on the tip 12 of the pole extension, said link remaining locked in position between said ribs and the annular collar 13, forming an integral part of said tip. The outer ends of the pole-pieces preferably pass through the rings 14, pivotally secured to the lugs 15 of the band 16, formed on each yoke-arm, the said rings 14 thus bringing the pole-pieces nearer to the arms. These pole-pieces 9 serve as tie-rods or tension members for the strains of compression to which the parts 3 and 6 are subjected under circumstances of retarding of the vehicle or the backing up of the animals. The connection between the yoke-arms and the collars C of the horses is made by the breast-straps 17, coupled to the rings 18, loosely passed about the yoke-arms, and to the collars, respectively.

From the foregoing it is apparent that the neck-yoke is readily removable from the pole, the socket 1 readily slipping off the pole when occasion for such removal arises. The arms 6 6 being capable of oscillation in a plane parallel to the pole extension can be folded against the latter. (See dotted position of parts in Fig. 3.) When occasion arises to clean and polish the metallic fittings, the link 10, by giving thereto a turn at right angles to the position shown in Fig. 5, (see dotted position in said figure,) so as to bring the elongated opening thereof parallel to the plane of the wings or ribs 11, can be slipped off the tip 12, thus leaving all such metallic parts exposed and free to be polished and cleaned.

The yoke being freely rotatable about the pole as an axis, and possessing, as it does, yoke-arms capable of oscillation in a plane parallel to such axis, and being, furthermore, equipped with pole-pieces which serve as tension members for compression strains communicated to the pole extension and yoke-arms under circumstances previously referred to, it follows that the several advantages attributed thereto and above enumerated must necessarily flow from its construction as defined and shown. The yoke readily responds to any and all movements of the animals under the most unfavorable conditions of the road traveled over, under any disparity in the heights of the animals, their relative speeds, and the like, and while functionally applicable to these several conditions it presents a smart and artistic appearance in front of the horses.

I need not, of course, wish to be limited to the precise details here set forth, as they may in a measure be departed from without affecting either the nature or spirit of my invention. Preferably the yoke-arms 6 6 are pivoted independently, as shown; but it is to be understood that it is within the spirit of my invention to substitute therefor a single rigid bar pivoted at the center. The separate arms 6, however, are preferable to a single rigid bar, in that the strain to which the same are subjected in the retarding of the vehicle are at all times communicated to the pole-pieces, serving as tension members and bringing a simultaneous strain of compression on the several members 3 6 6. Were the arms 6 6 in the form of a single rigid bar centrally pivoted, it is apparent that in time the elongation of the pole-pieces (due to constant wear) would cause the strain to be brought entirely upon such single bar and the pole extension would thus be deprived of its portion of the load.

The invention, of course, is applicable to all classes of poled vehicles, such as sleighs, gun-carriages, and the like.

Having described my invention, what I claim is—

1. A neck-yoke comprising a suitable socket rotatable about the pole as an axis, a pole extension pivotally secured at its base to the socket, and yoke-arms pivoted on each side of the base of said pole extension and capable of oscillation in a plane parallel therewith, substantially as set forth.

2. A neck-yoke comprising a suitable pole-socket, a fork at the outer end of the socket, a pole extension pivotally secured between the arms of said fork, laterally-extending plates carried by the base of the pole extension, yoke-arms pivotally secured between the plates on each side of the pole extension and oscillating in a plane parallel thereto, substantially as set forth.

3. A neck-yoke having a suitable pole extension, yoke-arms pivoted on opposite sides of the base thereof and oscillating in a plane parallel therewith, and yoke-pieces secured to said arms and engaging the free end of the pole extension thereby serving as tension members or ties for said arms, substantially as set forth.

4. In a neck-yoke, a pole extension terminating in a suitable tip, ribs or wings disposed on diametrically opposite sides thereof, a collar formed about the tip beyond the bases of the ribs, and a pole-piece loop normally locking between the collar and bases of the ribs, and having an elongated opening adapted to aline with the plane of disposition of the ribs when swung at right angles to its locked position, permitting the loop to become disengaged, substantially as set forth.

5. A neck-yoke having pivoted yoke-arms oscillating in the plane of the carriage-pole, and bodily rotatable about the axis of the pole, a pole extension projecting forward beyond the pivots of the yoke-arms, and pole-pieces coupling said yoke-arms to the pole extension, substantially as set forth.

6. A neck-yoke having yoke-arms pivoted to swing in the plane of the carriage-pole, and bodily rotatable about the axis of said pole, a pole extension projecting forward beyond the axis of oscillation of said yoke-arms, and pole-pieces coupling said yoke-arms to the pole extension, substantially as set forth.

In testimony whereof I affix my signature in presence of two witnesses.

THOMAS H. BRIGG.

Witnesses:
EMIL STAREK,
MARY D. WHITCOMB.